United States Patent
Yokomizo (10) Patent No.: US 10,607,322 B2
(45) Date of Patent: Mar. 31, 2020

(54) IMAGE PROCESSING APPARATUS AND METHOD FOR CONTROLLING THE SAME, IMAGING APPARATUS, AND MONITORING SYSTEM

(71) Applicant: CANON KABUSHIKI KAISHA, Tokyo (JP)

(72) Inventor: Tsuyoshi Yokomizo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/009,307

(22) Filed: Jun. 15, 2018

(65) Prior Publication Data

US 2018/0365814 A1 Dec. 20, 2018

(30) Foreign Application Priority Data

Jun. 20, 2017 (JP) ................. 2017-120807

(51) Int. Cl.
| | | |
|---|---|---|
| *G06T 5/00* | (2006.01) | |
| *H04N 19/597* | (2014.01) | |
| *H04N 19/17* | (2014.01) | |
| *H04N 5/232* | (2006.01) | |
| *H04N 5/217* | (2011.01) | |
| *G06T 3/00* | (2006.01) | |
| *H04N 19/124* | (2014.01) | |

(52) U.S. Cl.
CPC ............ *G06T 5/006* (2013.01); *G06T 3/0062* (2013.01); *H04N 5/217* (2013.01); *H04N 5/23216* (2013.01); *H04N 5/23238* (2013.01); *H04N 5/232945* (2018.08); *H04N 19/17* (2014.11); *H04N 19/597* (2014.11); *G06T 2200/24* (2013.01); *G06T 2207/30232* (2013.01); *H04N 19/124* (2014.11)

(58) Field of Classification Search
CPC combination set(s) only.
See application file for complete search history.

(56) References Cited

U.S. PATENT DOCUMENTS

| | | | |
|---|---|---|---|
| 8,645,105 B1 * | 2/2014 | Shepherd ................ G06F 8/355 703/1 |
| 2004/0015343 A1 * | 1/2004 | Nakayama .............. G06F 9/454 704/8 |
| 2007/0223830 A1 * | 9/2007 | Ono ................... G06K 9/00268 382/254 |

(Continued)

FOREIGN PATENT DOCUMENTS

| | | |
|---|---|---|
| JP | 06-284395 A | 10/1994 |
| JP | 2006-115046 A | 4/2006 |

*Primary Examiner* — Alexander Gee (74) *Attorney, Agent, or Firm* — Cowan, Liebowitz & Latman, P.C.

(57) ABSTRACT

An image processing apparatus obtains a first image, and cuts out at least a portion of the first image to generate a second image that is distortion-corrected. The image processing apparatus provides a first user interface for setting, in the first image, an area associated with a function that influences encoding processing, and a second user interface for setting, in the second image, an area associated with the function that influences encoding processing. The image processing apparatus encodes the first image based on the area set using the first user interface, and encodes the second image using the area set using the second user interface.

16 Claims, 8 Drawing Sheets

(56) References Cited

U.S. PATENT DOCUMENTS

| | | | | |
|---|---|---|---|---|
| 2011/0141141 | A1* | 6/2011 | Kankainen | G01C 21/3647 |
| | | | | 345/632 |
| 2015/0016746 | A1* | 1/2015 | Tsubota | G06T 5/006 |
| | | | | 382/275 |
| 2015/0125030 | A1* | 5/2015 | Suzuki | A61B 5/441 |
| | | | | 382/103 |
| 2015/0324465 | A1* | 11/2015 | Logan | H04L 41/0853 |
| | | | | 707/770 |
| 2016/0078276 | A1* | 3/2016 | Bengtsson | G06K 9/00127 |
| | | | | 382/134 |
| 2016/0132219 | A1* | 5/2016 | Shaw | G06F 3/0481 |
| | | | | 715/779 |
| 2017/0031510 | A1* | 2/2017 | Yi | G06F 3/041 |
| 2017/0371483 | A1* | 12/2017 | Ficner | G06F 3/0416 |
| 2018/0052966 | A1* | 2/2018 | Morris | G16H 50/30 |

* cited by examiner

IMAGE PROCESSING APPARATUS AND METHOD FOR CONTROLLING THE SAME, IMAGING APPARATUS, AND MONITORING SYSTEM

BACKGROUND OF THE INVENTION

Field of the Invention

The present invention relates to an image processing apparatus and a method for controlling the same, an imaging apparatus, and a monitoring system.

Description of the Related Art

Omnidirectional cameras in which an omnidirectional mirror or an entire circumference fish-eye lens is mounted are imaging apparatuses that capture images of an entire circumferential (360-degree) view at a time, and are used for various applications such as a monitoring camera and robot navigation. An omnidirectional camera in which an entire circumference fish-eye lens is mounted captures a 360-degree fish-eye image in a ring shape or a circular shape, for example. A captured fish-eye image contains distortion, but a cut image, such as a panoramic image or a planar perspective projection image, can be obtained by cutting out an image from the fish-eye image and performing geometric conversion processing thereon.

Japanese Patent Laid-Open No. 2006-115046 discloses a technique of partially cutting out an image obtained by a wide viewing angle camera, such as an omnidirectional camera, and delivering this cut image. Meanwhile, recently, regarding imaging apparatuses such as a network camera, an imaging apparatus capable of changing image quality in respective areas has been proposed. Japanese Patent Laid-Open No. 06-284395 discloses that the data volume of an image is suppressed while increasing the substantial image quality by increasing the image quality in a screen center portion and reducing the image quality in a peripheral portion.

The MPEG standard is known as a moving image compression and encoding technique. An encoding apparatus that encodes a moving image conforming to the MPEG standard determines a target amount of code for each picture based on a target data rate. Then, based on the target amount of code for each picture, the target amount of code is allocated in an averaged manner to all macroblocks that constitute each picture. Thereafter, the quantization step width for encoding each macroblock is determined so as to achieve the target amount of code, and encoding is performed. If this quantization step width is made smaller, the amount of code increases but a high-quality image can be obtained. Accordingly, for example, in the case of increasing the image quality in an area that is set in an image to be encoded, the quantization step width for macroblocks that constitute this area is made smaller than the quantization step width for macroblocks in the other area. Note that, in the HEVC (High Efficiency Video Coding) standard, the quantization step is determined using a unit called a "coding unit", rather than a macroblock. In any case, in the moving image compression and encoding techniques, the quantization step is determined for each of the rectangular block units, each of which is constituted by a plurality of pixels. Note that, in the moving image compression and encoding techniques, parameters other than the quantization step are also basically determined for each of the rectangular block units.

Figure 8A:
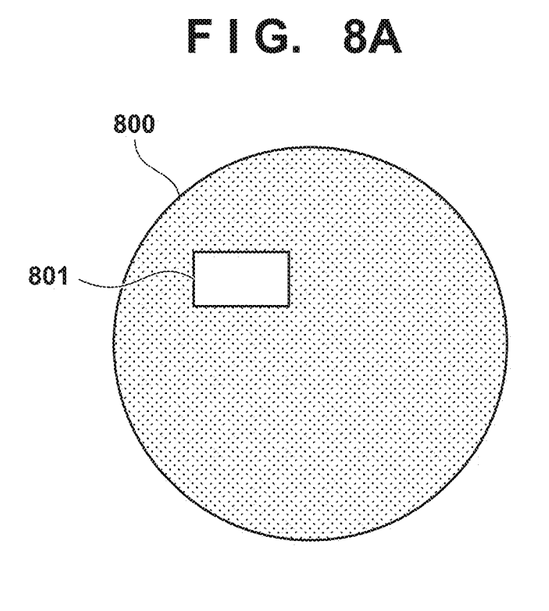
FIGS. 8A and 8B are diagrams showing a relationship between a cut-out area in a fish-eye image and a cut-out area in a cut image.
Figure 8B:
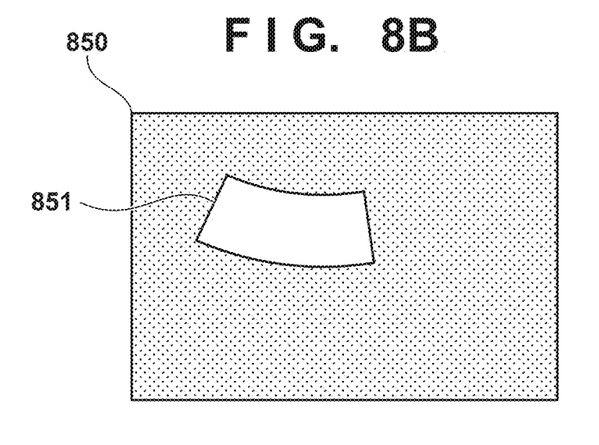

A case is considered where an area 801, which is to be encoded so as to increase the image quality, is set in a fish-eye image 800, as shown in FIG. 8A. In FIG. 8B, a cut image 850 is an image obtained by cutting out a portion of the fish-eye image 800 that contains distortion, and performing geometric conversion processing to remove the distortion. If the high-quality image area 801 that is set in the fish-eye image 800 is expanded in the cut image 850, the area 801 is distorted due to the aforementioned geometric conversion processing and thus becomes an area 851. The area 851 does not have a shape that is based on a macroblock unit, and, in the case of performing encoding for each macroblock as in the MPEG standard, an area that is to be encoded so as to increase the image quality cannot be set in the cut image 850. This point applies not only to the area that is to be encoded so as to increase the image quality, but also to the case of setting an area that is associated with a function that influences the encoding.

SUMMARY OF THE INVENTION

An embodiment of the present invention provides an image processing apparatus in which an area that is associated with a function that influences encoding processing can be set appropriately in both a first image and a second image that has been cut out of the first image and in which distortion has been corrected, a control method thereof, an imaging apparatus, and a monitoring system.

According to one aspect of the present invention, there is provided an image processing apparatus comprising: an obtaining unit configured to obtain a first image; a generating unit configured to cut out at least a portion of the first image to generate a second image that is distortion-corrected; a providing unit configured to provide a first user interface for setting, in the first image, an area associated with a function that influences encoding processing, and a second user interface for setting, in the second image, an area associated with the function that influences encoding processing; and an encoding unit configured to encode the first image based on the area set using the first user interface, and encode the second image based on the area set using the second user interface.

According to another aspect of the present invention, there is provided an imaging apparatus comprising: an imaging unit; an obtaining unit configured to obtain a first image captured by the imaging unit; a generating unit configured to cut out at least a portion of the first image to generate a second image that is distortion-corrected; a providing unit configured to provide an external apparatus with a first user interface for setting, in the first image, an area associated with a function that influences encoding processing, and a second user interface for setting, in the second image, an area associated with the function that influences encoding processing; and an encoding unit configured to encode the first image based on the area set by the external apparatus using the first user interface, and encode the second image based on the area set by the external apparatus using the second user interface.

According to another aspect of the present invention, there is provided a monitoring system that includes an imaging apparatus, an image processing apparatus, and a client apparatus, the image processing apparatus comprising: an obtaining unit configured to obtain a first image captured by the imaging apparatus; a generating unit configured to cut out at least a portion of the first image to generate a second image that is distortion-corrected; a providing unit configured to provide the client apparatus with a first user interface for setting, in the first image, an area associated with a function that influences encoding processing, and a second user interface for setting, in the second image, an area associated with the function that influences encoding processing; and an encoding unit configured to encode the first image based on the area set by the client apparatus using the first user interface, and encode the second image based on the area set by the client apparatus using the second user interface.

According to another aspect of the present invention, there is provided a method for controlling an image processing apparatus, comprising: obtaining a first image; cutting out at least a portion of the first image to generate a second image that is distortion-corrected; providing a first user interface for setting, in the first image, an area associated with a function that influences encoding processing, and a second user interface for setting, in the second image, an area associated with the function that influences encoding processing; and encoding the first image based on the area set using the first user interface, and encoding the second image based on the area set using the second user interface.

According to another aspect of the present invention, there is provided a non-transitory computer-readable medium storing a program for causing a computer to execute a method for controlling an image processing apparatus, the control method comprising: obtaining a first image; cutting out at least a portion of the first image to generate a second image that is distortion-corrected; providing a first user interface for setting, in the first image, an area associated with a function that influences encoding processing, and a second user interface for setting, in the second image, an area associated with the function that influences encoding processing; and encoding the first image based on the area set using the first user interface, and encoding the second image based on the area set using the second user interface.

Further features of the present invention will become apparent from the following description of exemplary embodiments (with reference to the attached drawings).

DESCRIPTION OF THE EMBODIMENTS

Hereinafter, the embodiments of the present invention will be described in detail based on the drawings.

First Embodiment

Figure 1A:
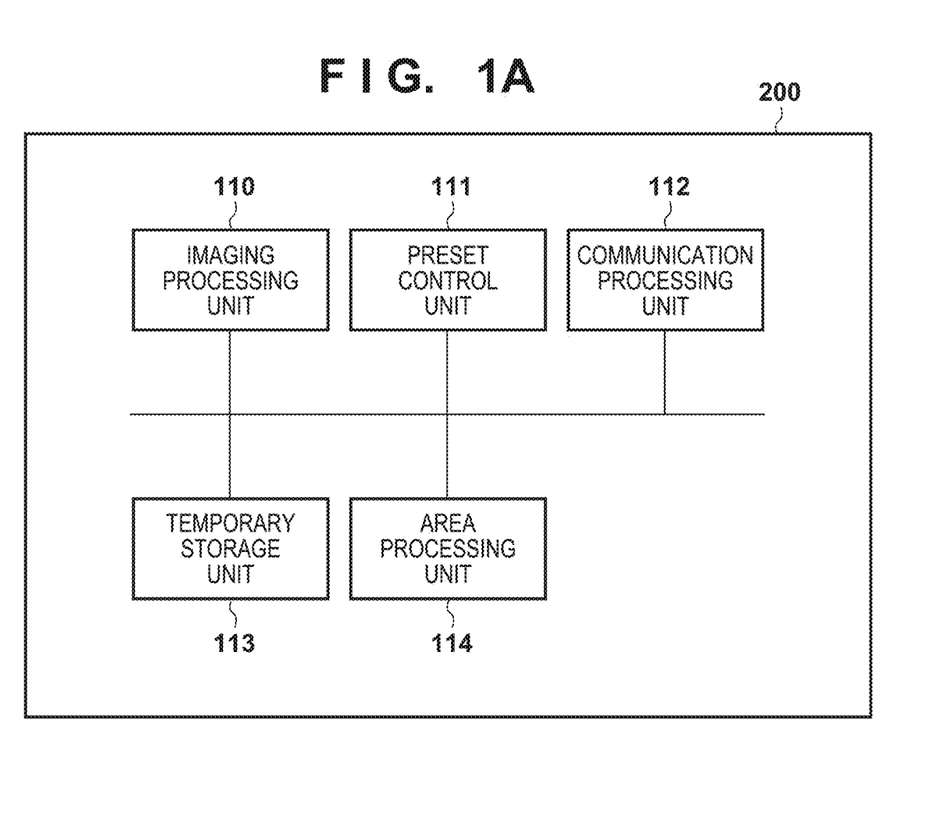
FIG. 1A is a block diagram showing an example of a functional configuration of a camera server according to the present embodiments.
Figure 1B:
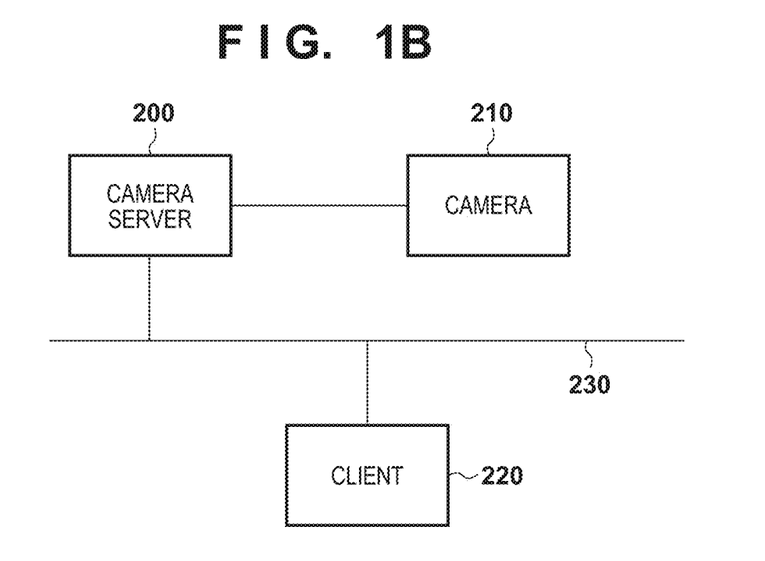
FIG. 1B is a diagram showing an example of a configuration of a monitoring system according to the present embodiments.

FIG. 1B is a diagram showing an example of an apparatus configuration of a monitoring system according to the first embodiment. A camera server 200, which serves as an image processing apparatus, and a client 220 are communicably connected to each other via a network 230. The camera server 200 is connected to a camera 210, the angle of view of which is variable, and delivers an image captured by the camera 210 to an external apparatus via the network 230. The camera 210 is, for example, an omnidirectional camera in which an entire circumference fish-eye lens is mounted. The client 220, which serves as an external apparatus, controls imaging parameters for pan/tilt/zoom, focus, exposure, or the like, while accessing the camera server 200 and obtaining an image. The client 220 also presets these imaging parameters for the camera server 200. The details will be described later. Not that, although a monitoring system that includes one camera server is described for simplification of the description, two or more camera servers may also be provided. A client that is not the client 220 and accesses the camera server 200 to receive and accumulate images may also be provided. Functions of the camera server 200 may also be incorporated in the camera 210.

The network 230 is constituted by a plurality of routers, switches, cables, or the like that conform to a communication standard, such as Ethernet (registered trademark). In this embodiment, any communication standard, scale, or configuration of the network 230 may be employed as long as the server and client can communicate without a problem. Accordingly, various kinds of networks, including the Internet and a LAN (Local Area Network), are applicable to the network 230.

Figure 2:
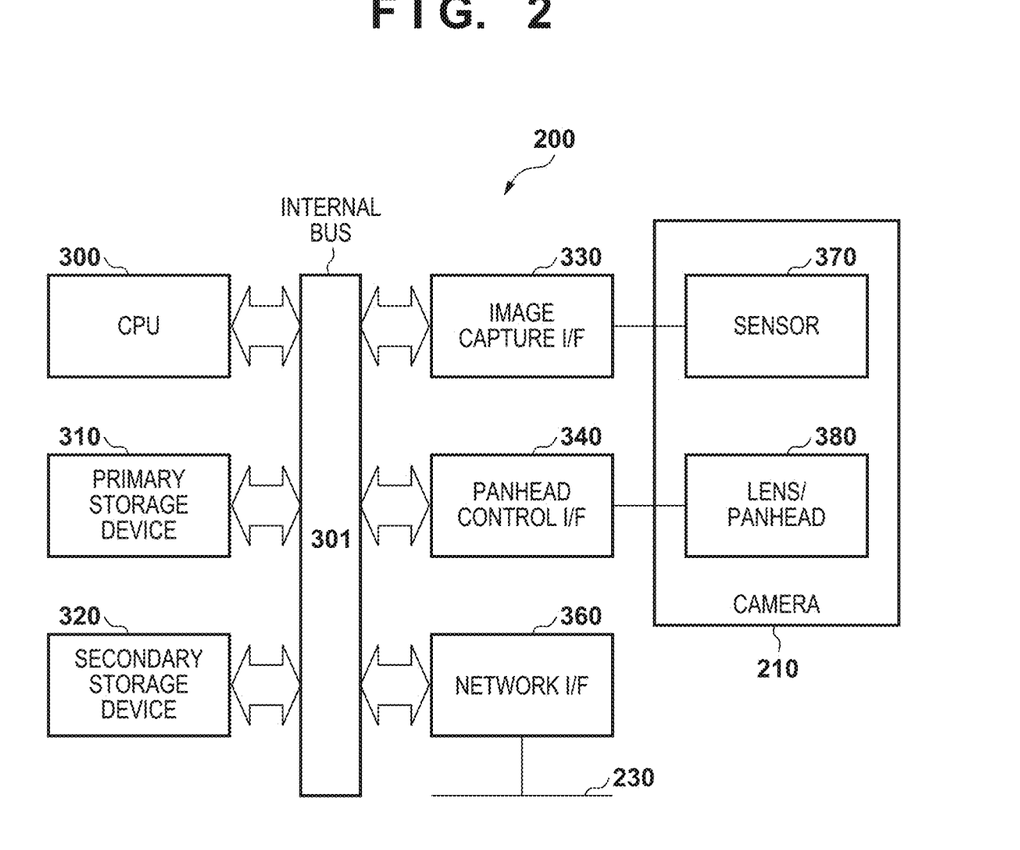
FIG. 2 is a block diagram showing an example of a hardware configuration of the camera server according to the present embodiments.

FIG. 2 is a block diagram showing an example of a hardware configuration of the camera server 200. In the camera server 200, a CPU 300, a primary storage device 310, a secondary storage device 320, an image capture I/F 330, a panhead control I/F 340, and a network I/F 360 are connected to one another via an internal bus 301.

The CPU 300 realizes various kinds of control by executing predetermined programs that are loaded to the primary storage device 310. The primary storage device 310 is a high-speed writable storage device, which is typified by a RAM. An OS and various programs that are to be executed by the CPU 300, and various kinds of data are loaded from the secondary storage device 320 to the primary storage device 310. The primary storage device 310 is also used as a work area for the CPU 300 that executes the OS and various programs. The secondary storage device 320 is a nonvolatile storage device, which is typified by an FDD, an HDD, a flash memory, a CD-ROM drive, or the like. The secondary storage device 320 is used as a permanent storage area for storing the OS, various programs, and various kinds of data. The secondary storage device 320 is also used as a storage area for storing various kinds of short-term data. The details of various programs and the like stored in the primary storage device 310 and the secondary storage device 320 in the camera server 200 will be described later.

An image sensor 370 in the camera 210 is connected to the image capture I/F 330. The image sensor 370 is constituted by a CCD sensor or a CMOS sensor. The CPU 300 obtains image data from the image sensor 370 via the image capture IX 330, performs image processing on the obtained image data in accordance with image quality parameters, converts and compresses the processed image into a predetermined format, and stores the resulting image in the primary storage device 310. The panhead control I/F 340 is connected to a lens/panhead 380 of the camera 210. The CPU 300 controls the pan/tilt/zoom mechanism in the lens/panhead 380 via the panhead control I/F 340 to change the imaging position and the angle of view of the camera 210 (image sensor 370). The network I/F 360 is an I/F for connecting to the network 230, and enables communication with the client 220, for example, via a communication medium such as Ethernet.

FIG. 1A is a block diagram showing an example of a functional configuration of the camera server 200. Functional units shown in FIG. 1A, namely an imaging processing unit 110, a preset control unit 111, a communication processing unit 112, an area processing unit 114, and a temporary storage unit 113 are realized by the CPU 300 executing programs (software) that are loaded to the primary storage device 310. However, the functional units may be realized by dedicated hardware, or may also be realized through cooperation between hardware and software.

The imaging processing unit 110 obtains an image captured by the camera 210 (an image that contains distortion), and cuts out at least a portion of the obtained image to generate a distortion-corrected image. More specifically, the imaging processing unit 110 obtains, via the image capture I/F 330, image data generated by the image sensor 370, and performs image processing and encoding processing in accordance with image quality parameters that are designated by the preset control unit 111. Note that, in this embodiment, an omnidirectional image (fish-eye image) is obtained from the image sensor 370, and the imaging processing unit 110 outputs fish-eye image data, in which the entire fish-eye image is encoded. The imaging processing unit 110 also outputs cut image data, in which an image (cut image) that is obtained by cutting out a portion of a fish-eye image and performing geometric conversion (distortion correction) on this cut-out portion to eliminate or reduce distortion, is encoded. Note that the client 220 may be able to set the cutting position and cutting size of the cut image. In this embodiment, a fish-eye image is used as an image that contains distortion, but is not limited thereto.

The preset control unit 111 controls the lens/panhead 380 via the panhead control I/F 340 in accordance with imaging parameters such as a preset position, a preset circulation setting, and/or a preset setting of movement according to an event that are set through the client 220. Thus, the pan/tilt/zoom position is controlled in accordance with the preset content. The preset control unit 111 also sets image quality parameters that are saved as preset parameters, for the imaging processing unit 110. The image quality parameters include, for example, parameters for focus, exposure, white balance, day/night, smart shade control, noise reduction, sharpness, color contrast, and the like. The preset parameters may also include information that indicates a cutting range for obtaining a cut image from a fish-eye image.

The communication processing unit 112 sends image data that is saved in the primary storage device 310 to the client 220 via the network I/F 360 and the network 230, in accordance with a request from the client 220. The communication processing unit 112 also informs the preset control unit 111 of imaging parameters (pan/tilt/zoom positions etc.) and image quality parameters that are sent from the client 220. The received preset content is saved in the secondary storage device 320.

The temporary storage unit 113 saves, in the primary storage device 310, image data (fish-eye image data, cut image data) that has been encoded by the imaging processing unit 110. The area processing unit 114 accepts designation of a high-quality image area (an example of an area that is associated with a function that influences encoding processing) that is designated by the client 220 and in which image quality is to be made higher than the image quality in the other area of the same image, and sets the designated high-quality image area for the imaging processing unit 110. The details of the high-quality image area will be described later. For example, the area processing unit 114 sets the step width of the quantization step of macroblocks that constitute the area designated as the high-quality image area in a fish-eye image or a cut image, to be smaller than that in the other area. Thus, in the image data generated by the imaging processing unit 110, the image quality in the high-quality image area is higher than the image quality in the other area. At this time, the high-quality image area is formed in units of macroblocks, as mentioned above. Note that cooperation between the functional units may be realized by using functions provided by the operating system, for example. Note that a macroblock is an example of a processing unit of encoding, but need only be the processing unit of encoding that is defined by a moving image compression/encoding standard that is to be used. The function that influences encoding processing is not limited to the function of changing the image quality in a specific area in an image, but need only be a function with which parameters associated with encoding change.

Figure 3:
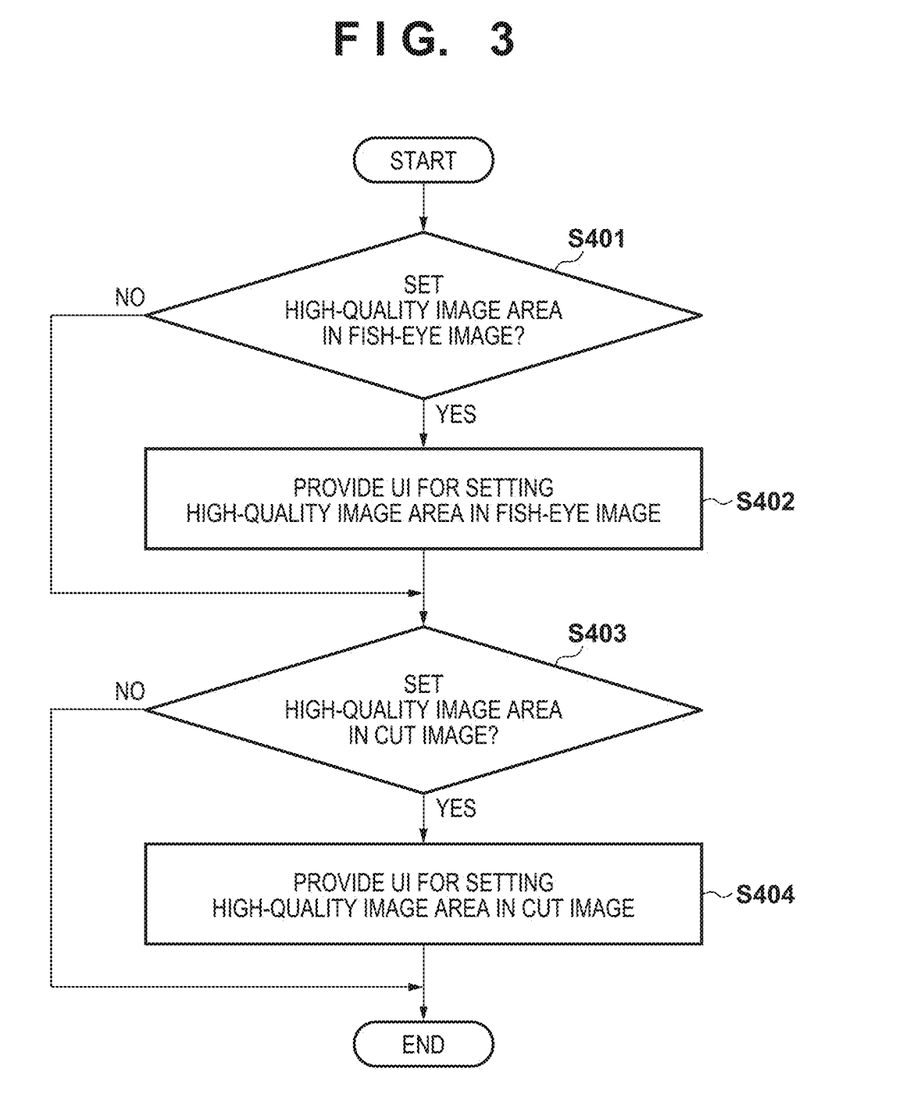
FIG. 3 is a flowchart illustrating processing to set a high-quality image area in a fish-eye image and a cut image, according to a first embodiment.
Figure 4:
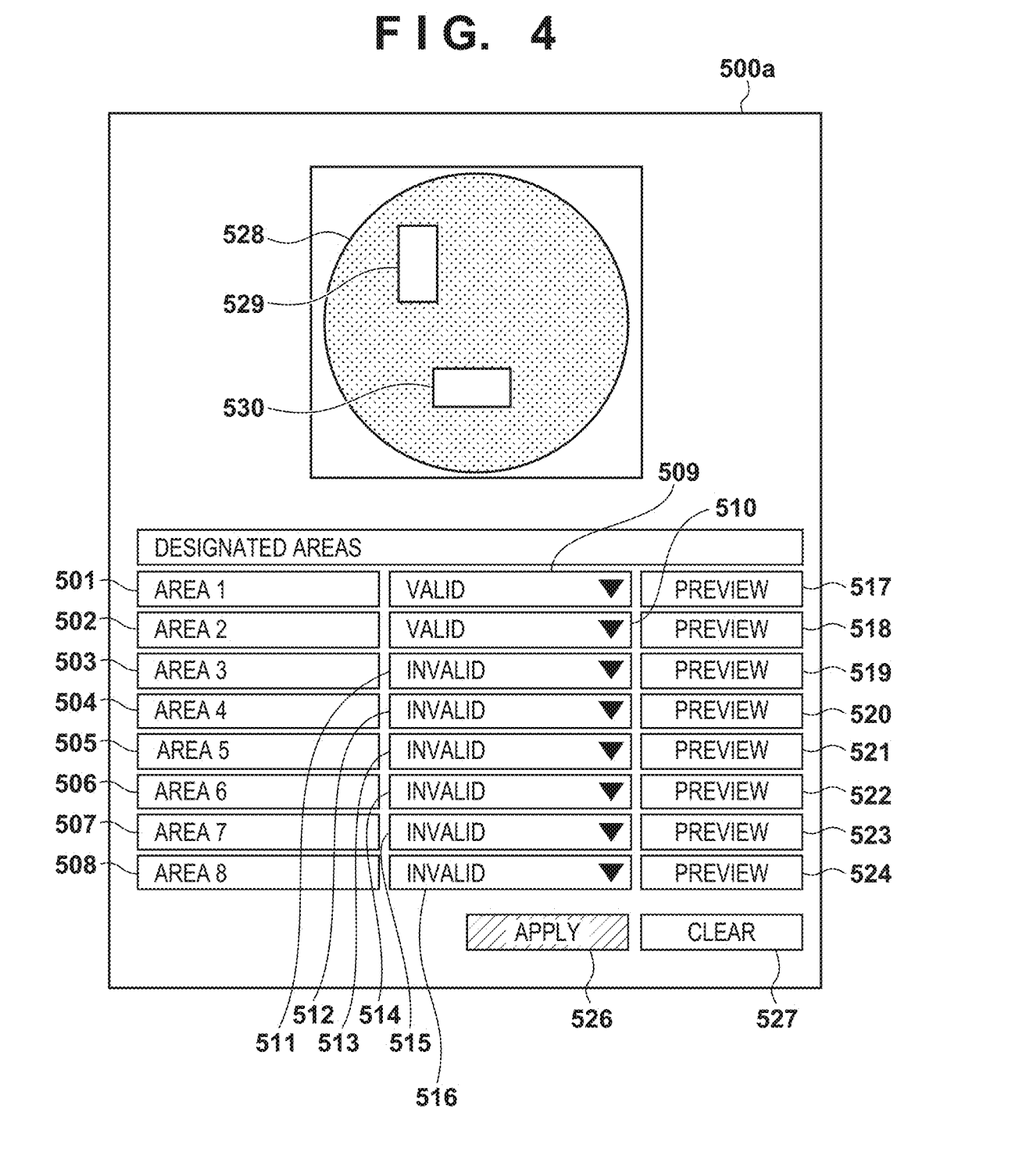
FIG. 4 is a diagram showing an example of a UI screen for setting a high-quality image area in a fish-eye image.
Figure 5:
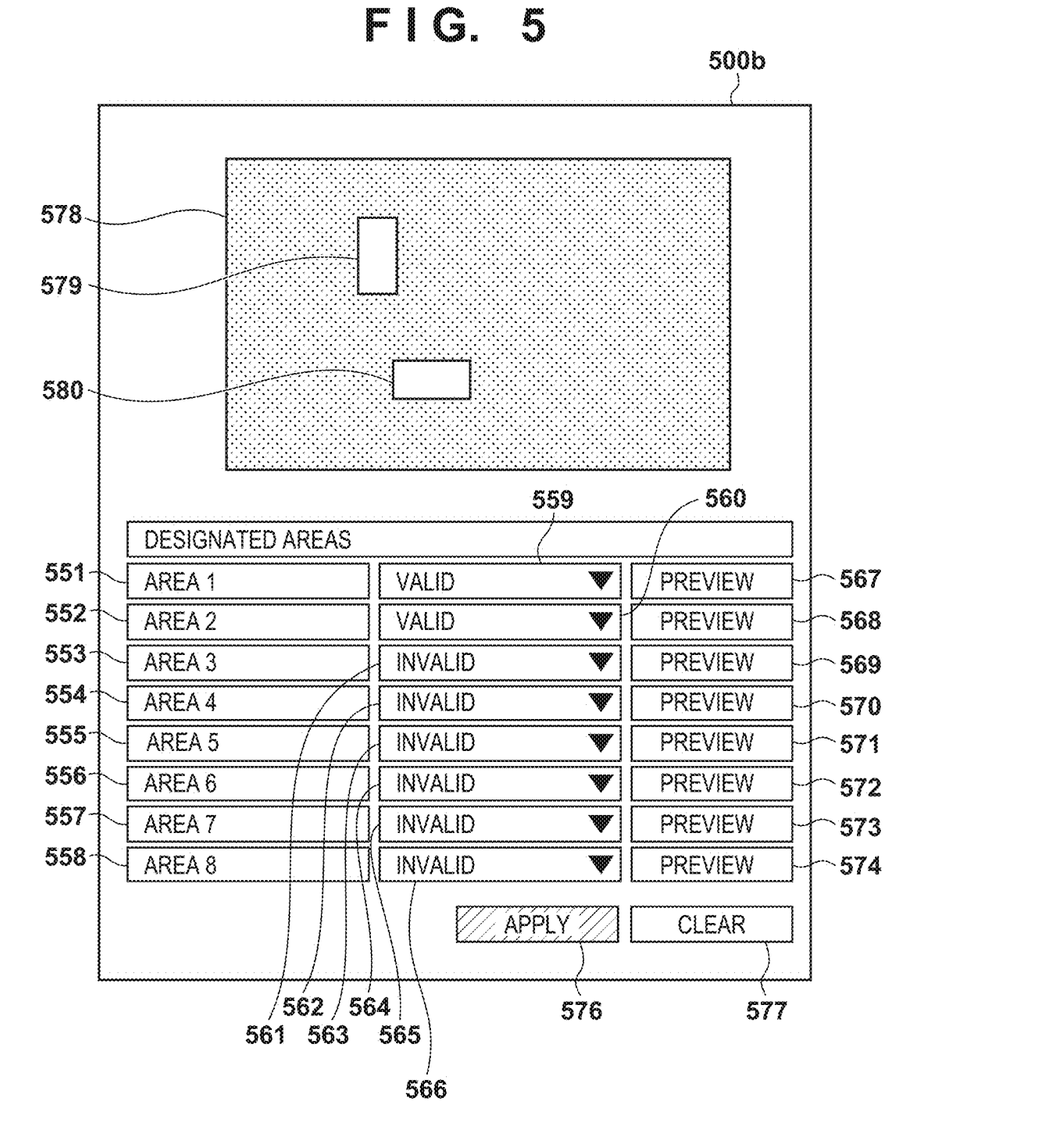
FIG. 5 is a diagram showing an example of a screen for setting a high-quality image area in a cut image.

High-quality image area setting processing according to the first embodiment will now be described with reference to FIGS. 3, 4, and 5. FIG. 3 is a flowchart illustrating processing that is performed by the camera server 200 to set a high-quality image area in a fish-eye image and a cut image that is cut out from this fish-eye image and in which distortion has been reduced or eliminated through geometric conversion processing. FIGS. 4 and 5 show examples of user interface (UI) screens on the client 220 for setting a high-quality image area. FIG. 4 shows a user interface screen (UI screen) for setting a high-quality image area in a fish-eye image, and FIG. 5 shows a user interface screen (UI screen) for setting a high-quality image area in a cut image.

Note that, in this embodiment, the UIs are provided to the client 220 by the camera server 200. For example, a UI for setting a high-quality image area using the client 220 is provided in the form of a web page by the area processing unit 114, and is displayed by a browser that operates on the client 220. Needless to say, the provision form of the UIs is not limited thereto, and the UIs may also be realized by executing a dedicated application on the client 220.

A user can give an instruction regarding whether to set a high-quality image area in a fish-eye image by operating a setting screen (not shown) or the like on the client 220, for example. If an instruction to set a high-quality image area in a fish-eye image is given, the camera server 200 is notified of this instruction from the client 220. Upon receiving the instruction to set a high-quality image area in a fish-eye image (YES in S401), the area processing unit 114 provides the client 220 a user interface for setting a high-quality image area in a fish-eye image. Specifically, the area processing unit 114 transmits an area setting screen 500a (FIG. 4) for fish-eye images to the client 220 (S402). Upon receiving the area setting screen 500a for fish-eye images, the client 220 displays the received area setting screen 500a on a display. If the instruction to set a high-quality image area in a fish-eye image is not given (NO in S401), the processing skips step S402 and proceeds to step S403.

FIG. 4 is a diagram showing an example of the area setting screen 500a for fish-eye images that is provided by the area processing unit 114 and is displayed on the client 220. A displayed fish-eye image 528 in the area setting screen 500a indicates a fish-eye image captured by the camera 210. A user can set a high-quality image area of the fish-eye image by designating a high-quality image area on this displayed fish-eye image 528. FIG. 4 shows a state where two high-quality image areas 529 and 530 are set to be valid.

In the area setting screen 500a according to this embodiment, up to eight high-quality image areas can be set, and validity and invalidity thereof can be set individually. Note that, needless to say, the number of settable high-quality image areas is not limited to eight. Items 501 to 508 correspond to the high-quality image areas that are set as areas 1 to 8 on a fish-eye image. For example, upon the user selecting the item 501 and designating a rectangle having any size at any position on the displayed fish-eye image 528 using a pointing device, a high-quality image area that corresponds to the area 1 is set. It is assumed in FIG. 4 that the high-quality image area 529 corresponds to the area 1, and the high-quality image area 530 corresponds to the area 2. For example, if the user designates the item 501 (area 1), a frame of the high-quality image area 529 that corresponds thereto is highlighted. If the user selects the high-quality image area 529 on the displayed fish-eye image 528, the corresponding item 501 is highlighted. Thus, the user can comprehend the correspondence between the items 501 to 508 and high-quality image areas on the fish-eye image.

Note that the reason for setting each area in a rectangular shape is because the processing unit of encoding (macroblock, coding unit etc.) is rectangular. Note that each area may not necessarily be defined in a rectangular shape, and may also be defined by lines parallel to a vertical direction or a lateral direction of the image. Also, areas set by the user may also be automatically adjusted in a manner suitable for the processing unit of encoding.

The user can set the validity or invalidity of each of the high-quality image areas that are the areas 1 to 8, by using pull-down lists 509 to 516. The user can also display a preview of each high-quality image area using preview buttons 517 to 524. In FIG. 4, the high-quality image area 529, which is the area 1 (501), and the high-quality image area 530, which is the area 2 (502), are valid. The user can also change the position and shape (aspect ratio of the rectangle) of the high-quality image areas 529 and 530 by using a pointing device, for example.

The above set content that is configured on the area setting screen 500a is transmitted from the client 220 to the camera server 200 upon an apply button 526 being pressed, and is saved in the secondary storage device 320 by the area processing unit 114. Upon a clear button 527 being pressed, the set content is restored to the content before being changed (i.e. the set content saved in the secondary storage device 320 is not updated). Upon the apply button 526 or the clear button 527 being pressed, setting processing (S402) using the area setting screen 500a ends, and the processing proceeds to step S403.

The user can give an instruction regarding whether to set a high-quality image area in a cut image, by operating a setting screen (not shown) or the like on the client 220, for example. If an instruction to set a high-quality image area in a cut image is given, the camera server 200 is notified of this instruction from the client 220. Upon receiving the instruction to set a high-quality image area in a cut image (YES in S403), the area processing unit 114 provides the client 220 with a user interface for setting a high-quality image area in a cut image. More specifically, the area processing unit 114 transmits an area setting screen 500b for cut images to the client 220 (S404). Upon receiving the area setting screen 500b for cut images, the client 220 displays the received area setting screen 500b on a display. If the instruction to set a high-quality image area in a cut image is not given (NO in S403), the processing skips step S404 and ends. Note that a configuration may also be employed in which, upon the apply button 526 in the area setting screen 500a for fish-eye images shown in FIG. 4 being pressed, the display of the client 220 transitions to the area setting screen 500b for cut images.

FIG. 5 is a diagram showing an example of the area setting screen 500b for cut images that is provided by the area processing unit 114 and is displayed on the client 220. A cut image is displayed as a displayed cut image 578 on the area setting screen 500b. The cut image is an image obtained by cutting out a portion of a fish-eye image captured by the camera 210 and being subjected to geometric conversion processing. The user can set a high-quality image area in a cut image by designating a high-quality image area on this displayed cut image 578. FIG. 5 shows a state where two high-quality image areas 579 and 580 are set to be valid.

Functions of items 551 to 558, pull-down lists 559 to 566, and preview buttons 567 to 574 are similar to the items 501 to 508, the pull-down lists 509 to 516, and the preview buttons 517 to 524 in FIG. 4. As with the area setting screen 500a for fish-eye images, the user can change the position and shape of the high-quality image area 579 and the high-quality image area 580 on the displayed cut image 578 by operating a pointing device. Here again, each area is set in a rectangular shape, as in the description of FIG. 4. This is because the processing unit of encoding has a rectangular shape. Note that, as in the description of FIG. 4, each area may not necessarily be defined by a rectangle, and may also be defined by lines parallel to a vertical direction or a lateral direction of the image. Also, areas set by the user may also be automatically adjusted in a manner suitable for the processing unit of encoding.

The set content that is configured on the area setting screen 500b is transmitted from the client 220 to the camera server 200 upon an apply button 576 being pressed, and is saved in the secondary storage device 320 by the area processing unit 114. Upon a clear button 577 being pressed, the set content is restored to the content before being changed (i.e. the set content saved in the secondary storage device 320 is not updated). Upon the apply button 576 or the clear button 577 being pressed, setting processing (S404) using the area setting screen 500b ends, and the processing in FIG. 3 ends.

As described above, according to the first embodiment, an area associated with a function that influences encoding processing can be set separately in a fish-eye image and a cut image that is cut out from the fish-eye image and in which distortion has been corrected. In addition, an area in a shape that is suitable for a prescribed processing unit of encoding processing can be set in both a fish-eye image and a cut image. Note that a user interface (area setting screen 500b) for setting an area in a cut image that is cut out from a fish-eye image may also be displayed in accordance with setting of an area in this fish-eye image (e.g. upon the apply button 526 being pressed). Conversely, a user interface (area setting screen 500a) for setting an area in an original fish-eye image from which a cut image is cut out, from which a cut image is cut out, may also be displayed in accordance with setting of an area in this cut image (e.g. upon the apply button 576 being pressed).

Second Embodiment

Figure 6:
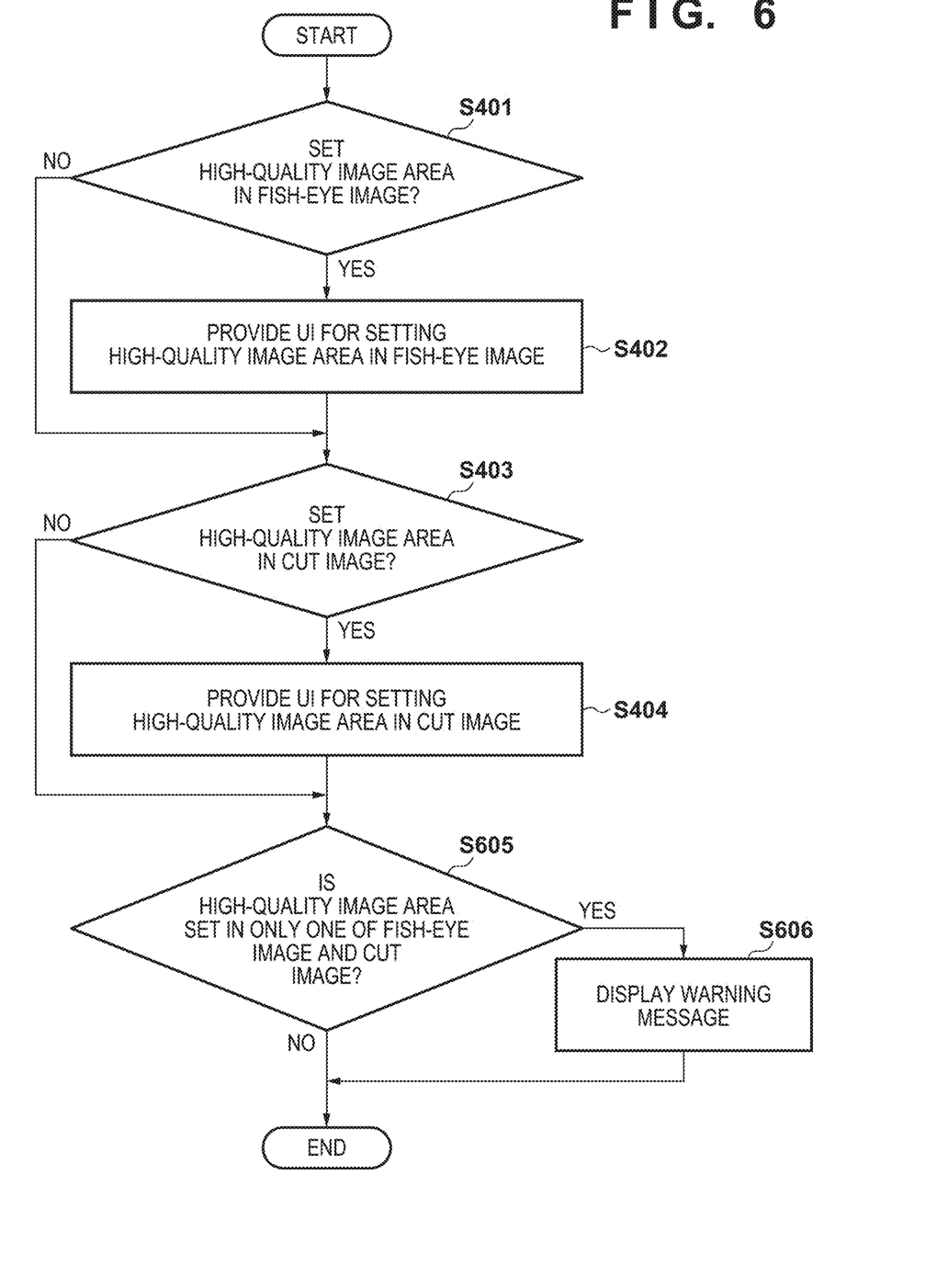
FIG. 6 is a flowchart illustrating processing to set a high-quality image area in a fish-eye image and a cut image, according to a second embodiment.

The second embodiment will be described below with reference to FIG. 6. In the second embodiment, if a high-quality image area in which image quality is to be made higher than the image quality in the other area of the same image (an example of an area associated with a function that influences encoding processing) has been set in only one of a fish-eye image and a cut image, a message indicating this setting is given. FIG. 6 is a flowchart illustrating processing to set a high-quality image area in a fish-eye image and a cut image, according to the second embodiment.

In FIG. 6, processing in steps S401 to S404 is the same as that in the first embodiment (FIG. 3). In step S605, the area processing unit 114 determines whether or not a high-quality image area is set in only one of the fish-eye image and the cut image. If a high-quality image area is set in only one of the fish-eye image and the cut image (YES in S605), the area processing unit 114 transmits a warning message to the client 220 (S606). As a result of the client 220 displaying this message on a UI screen (not shown), it is possible to prevent the user from setting a high-quality image area only in one of those images and forgetting to set a high-quality image area in the other image. If a high-quality image area is set in both the fish-eye image and the cut image, or if a high-quality image area is set in neither of these images (NO in S605), the processing skips step S606 and ends.

For example, the user can reflect the settings by pressing the apply button 526 in the area setting screen 500*a* for fish-eye images or pressing the apply button 576 in the area setting screen 500*b* for cut images. If the user switches the screen from the area setting screen to another screen in a state where a high-quality image area is set in only one of the fish-eye image or the cut image (i.e. in a state where one of the apply buttons 526 and 576 has been pressed and the other button leas not been pressed), the determination result in step S605 is YES. In this case, the area processing unit 114 transmits a warning message to the client 220 and displays the warning message on a UI screen (not shown) of the client (S606).

As described above, according to the second embodiment, if a high-quality image area is set in only one of a fish-eye image and a cut image, the user is warned about this setting, thereby preventing the user from forgetting to set an area that was originally to be set. Note that, although a warning message is displayed here, a configuration may also be employed in which an error message is displayed, and then the screen is forcibly switched to an area setting screen for the image in which a high-quality image area is not set.

Third Embodiment

Figure 7:
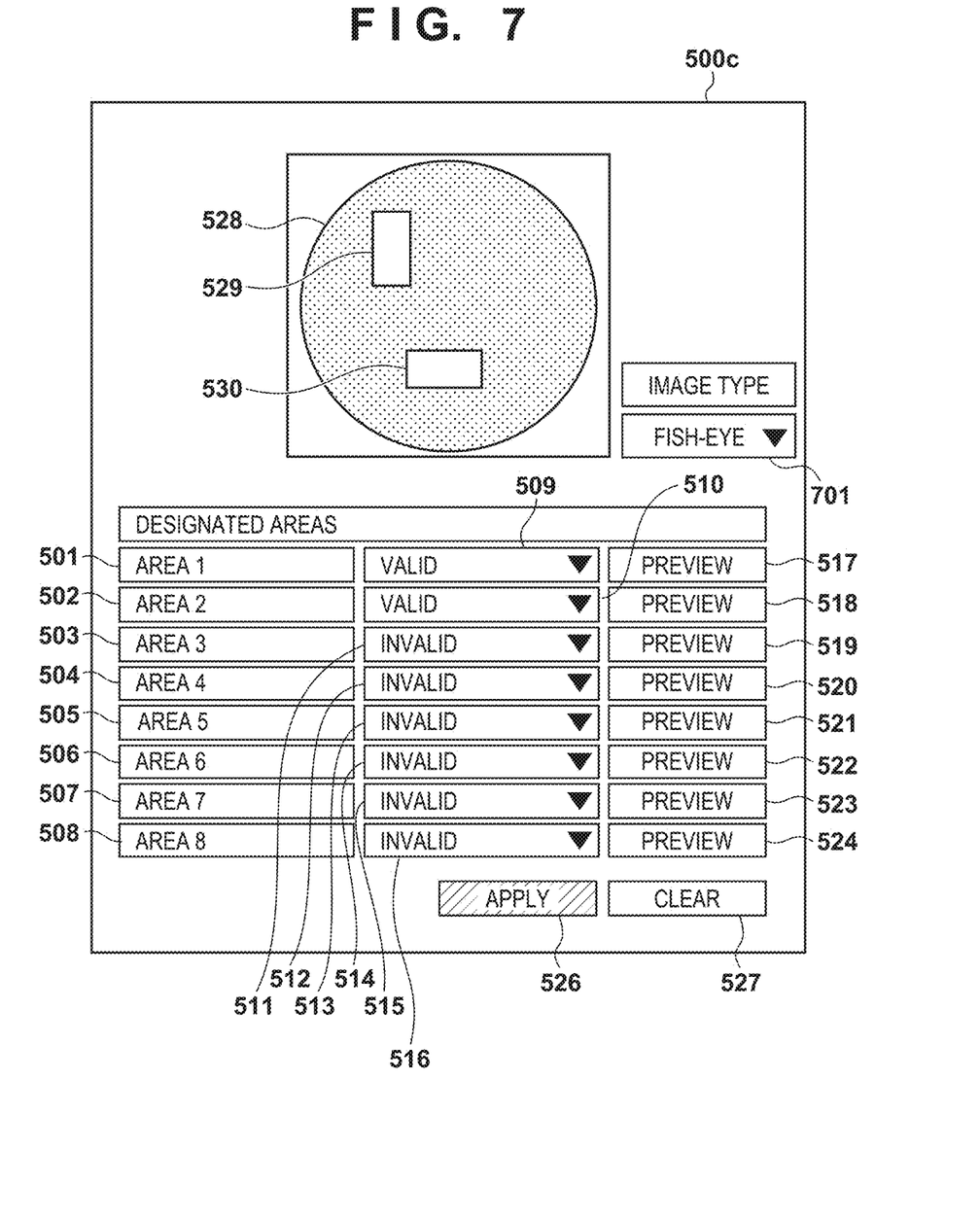
FIG. 7 is a diagram showing an example of a UI screen for setting a high-quality image area, according to a third embodiment.

In the above embodiments, the area setting screen 500*a* may also include an operation item for switching to the area setting screen 500*b*, and the area setting screen 500*b* may also include an operation item for switching to the area setting screen 500*a*. In this case, for example, an area setting screen 500*c*, such as one shown in FIG. 7, is used. FIG. 7 is a diagram showing an example of a UI screen on the client 220 for setting a high-quality image area according to the third embodiment. The area setting screen 500*c* is an area setting screen for fish-eye images, and is the same as the area setting screen 500*a* shown FIG. 4 but additionally includes an image type pull-down list 701, which serves as an operation item for switching the user interface. If "fish-eye image" is selected in the image type pull-down list 701, the area setting screen for fish-eye images (FIG. 7) is provided. If "cut image" is selected in the image type pull-down list 701, the area setting screen for cut images is provided. In this case, the area setting screen for cut images is the area setting screen 500*b* shown in FIG. 5 to which the image type pull-down list 701 is added. If "cut image" is selected in the image type pull-down list 701 in the area setting screen 500*c* in FIG. 7 that is displaying a fish-eye image, the area setting screen for setting an area in a cut image that is cut out from the displayed fish-eye image is provided. Similarly, if "fish-eye image" is selected in the image type pull-down list 701 in the area setting screen that is displaying a cut image, the area setting screen for setting an area of the original fish-eye image of the displayed cut image is provided. The image type pull-down list 701 is included in both area setting screens.

In the above embodiments, the areas associated with a function that influences encoding processing are only switched between a valid state and an invalid state, but the present invention is not limited thereto. For example, a configuration may also be employed in which a plurality of image quality levels is provided, and a level can be designated for each area. For example, high image quality, medium image quality, or an invalid state may also be able to be designated for each area. Although the above embodiments describe a configuration in which an area to increase the image quality is designated, an area to reduce the image quality may also be designated. That is to say, a UI that the area processing unit 114 provides to the client 220 need only be one for setting an area in which the image quality is to differ from the image quality in the other area of a fish-eye image or a cut image. As for encoding performed by the imaging processing unit 110, a fish-eye image or a cut image is encoded so that the image quality in an area set through the UI differs from the image quality in the other area.

In the above embodiments, an area that corresponds to a high-quality image area set in a cut image may also be displayed (e.g. using dotted lines) on the displayed fish-eye image 528 on the area setting screen so that this area can be distinguished from the high-quality image areas 529 and 530. Similarly, an area that corresponds to a high-quality image area set in a fish-eye image may also be displayed (e.g. using dotted lines) on the displayed cut image 578 on the area setting screen so that this area can be distinguished from the high-quality image areas 579 and 580. Thus, for example, when setting a high-quality image area on the cut image, the user can check, on the displayed cut image 578, the high-quality image area set in the fish-eye image. In this case, the high-quality image area set in the fish-eye image is deformed from the rectangular shape due to geometric conversion for correcting distortion of the fish-eye image, but the user can set the area (rectangle) of the high-quality image area so as to encircle the deformed area. Thus, the user can readily set an area that corresponds to the high-quality image area set in the fish-eye image, as a high-quality image area in the cut image.

Although preferable embodiments of the present invention have been described above, the present invention is not limited to these embodiments, and various modifications and variations may be made within the scope of the gist of the present invention. For example, although, in the above embodiments, a high-quality image area is to be set in a fish-eye image and an image obtained by correcting the fish-eye image through geometric conversion processing, any kind of image other than a fish-eye image may be employed as long as correction is required.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-120807, filed Jun. 20, 2017 which is hereby incorporated by reference herein in its entirety.

What is claimed is:

1. An image processing apparatus comprising:
one or more processors; and
one or more memories including instructions that, when executed by the one or more processors, cause the apparatus to function as:
an obtaining unit configured to obtain a first image;
a generating unit configured to cut out at least a portion of the first image to generate a second image that is distortion-corrected;
a providing unit configured to provide a first user interface for setting, in the first image, an area associated with a function that influences encoding processing, and a second user interface for setting, in the second image, an area associated with the function that influences encoding processing;
an encoding unit configured to encode the first image based on the area set using the first user interface, and encode the second image based on the area set using the second user interface; and
an output unit configured to, if the area is set in only one of the first image and the second image, output a warning message for preventing a user from forgetting to set the area with respect to other image in which the area is not set.

2. The image processing apparatus according to claim 1, wherein the obtaining unit obtains an image captured by a camera as the first image, and
the generating unit generates the second image by cutting out a portion of the first image and performing geometric conversion processing on the cut-out portion.

3. The image processing apparatus according to claim 1, wherein the first image is a fish-eye image, and
the second image is a cut image obtained by cutting out a portion of the fish-eye image and performing geometric conversion processing on the cut-out portion.

4. The image processing apparatus according to claim 1, wherein the first user interface includes an operation item for switching to the second user interface, and the second user interface includes an operation item fir switching to the first user interface.

5. The image processing apparatus according to claim 1, wherein the area is set on the first image that is displayed in the first user interface, and the area is set on the second image that is displayed in the second user interface.

6. The image processing apparatus according to claim 5, wherein an area that corresponds to the area set in the second user interface is displayed so as to be distinguishable from the area set in the first user interface on the first image that is displayed in the first user interface, and an area that corresponds to the area set in the first user interface is displayed so as to be distinguishable from the area set in the second user interface on the second image that is displayed in the second user interface.

7. The image processing apparatus according to claim 1, wherein, in the first and second user interfaces, one or more areas can be set as the area, and each of the one or more areas is set to be valid or invalid.

8. The image processing apparatus according to claim 1, wherein, in the first and second user interlaces, one or more areas in which image quality is to be changed can be set as the area, and an image quality level is set for each of the one or more areas.

9. An imaging apparatus comprising:
an imaging unit;
one or more processors; and
one or more memories including instructions that, when executed by the one or more processors, cause the apparatus to function as:
an obtaining unit configured to obtain a first image captured by the imaging unit;
a generating unit configured to cut out at least a portion of the first image to generate a second image that is distortion-corrected;
a providing unit configured to provide an external apparatus with a first user interface for setting, in the first image, a n area associated with a function that influences encoding processing, and a second user interface for setting, in the second image, an area associated with the function that influences encoding processing;
an encoding unit configured to encode the first image based on the area set by the external apparatus using the first user interface, and encode the second image based on the area set by the external apparatus using the second user interface; and
an output unit configured to, if the area is set in only one of the first image and the second image, output a warning message for preventing a user from forgetting to set the area with respect to other in which the area is not set.

10. A monitoring system that includes an imaging apparatus, an image processing apparatus, and a client apparatus, the image processing apparatus comprising:
    one or more processors; and
    one or more memories including instructions that, when executed by the one or more processors, cause the apparatus to function as:
    an obtaining unit configured to obtain a first image captured by the imaging apparatus;
    a generating unit configured to cut out at least a portion of the first image to generate a second image that is distortion-corrected;
    a providing unit configured to provide the client apparatus with a first user interface for setting, in the first image, an area associated with a function that influences encoding processing, and a second user interface for setting, in the second image, an area associated with the function that influences encoding processing;
    an encoding unit configured to encode the first image based on the area set by the client apparatus using the first user interface, and encode the second image based on the area set by the client apparatus using the second user interface; and
    an output unit configured to, if the area is set in only one of the first image and the second image, output a warning message for preventing a user from forgetting to set the area with respect to other image in which the area is not set.

11. A method for controlling an image processing apparatus, comprising:
    obtaining a first image;
    cutting out at least a portion of the first image to generate a second image that is distortion-corrected;
    providing a first user interface for setting, in the first image, an area associated with a function that influences encoding processing, and a second user interface for setting, in the second image, an area associated with the function that influences encoding processing;
    encoding the first image based on the area set using the first user interface, and encoding the second image based on the area set using the second user interface; and
    outputting if the area is set in only one of the first image and the second image, a warning message for preventing a user from forgetting to set the area with respect to other image in which the area is not set.

12. A non-transitory computer-readable medium storing a program for causing a computer to execute a method for controlling an image processing apparatus, the control method comprising:
    obtaining a first image;
    cutting out at least a portion of the first image to generate a second image that is distortion-corrected;
    providing a first user interface for setting, in the first image, an area associated with a function that influences encoding processing, and a second user interface for setting, in the second image, an area associated with the function that influences encoding processing; and
    encoding the first image based on the area set using the first user interface, and encoding the second image based on the area set using the second user interface; and
    outputting, if the area is set in only one of the first image and the second image, a warning message for preventing a user from forgetting to set the area with respect to other image in which the area is not set.

13. An image progressing apparatus, comprising:
    one or more processors; and
    one or more memories including instructions that, when executed by the one or more processors, cause the apparatus to function as:
    an obtaining unit configured to obtain a first image;
    a generating unit configured to cut out at least a portion of the first image to generate a second image that is distortion-corrected;
    a providing unit configured to provide a first user interface for setting, in the first image, an area associated with a function that influences encoding processing, and a second user interface for setting, in the second image, an area associated with the function that influences encoding processing;
    an encoding unit configured to encode the first image based on the area set using the first user interface, and encode the second image based on the area set using the second user interface; and
    a switching unit configured to switch from the first user interface to the second user interface in response to a user operation to an operation button for completing the setting in the first user interface, or switches from the second user interface to the first user interface in response to a user operation to an operation button for completing the setting in the second user interface.

14. The apparatus according to claim 1, wherein the switching unit switches from the first user interface to the second user interface in response to a user operation selecting the second image from a list provided on the first user interface and the switching unit switches from the second user interface to the first user interface in response to a user operation selecting the first image from a list provided on the second user interface.

15. A method for controlling an image processing apparatus, comprising:
    obtaining a first image;
    cutting out at least a portion of the first image to generate a second image that is distortion-corrected;
    providing a first user interface for setting, in the first image, an area associated with a function that influences encoding processing, and a second user interface for setting, in the second image, an area associated with the function that influences encoding processing;
    encoding the first image based on the area set using the first user interface, and encoding the second image based on the area set using the second user interface; and
    switching from the first user interface to the second user interface in response to a user operation to an operation button for completing the setting in the first user interface, or switching from the second user interface to the first user interface in response to a user operation to an operation button for completing the setting in the second user interface.

16. A non-transitory computer-readable medium storing a program for causing a computer to execute a method for controlling an image processing apparatus, the control method comprising:
    obtaining a first image;
    cutting out at least a portion of the first image to generate a second image that is distortion-corrected;
    providing a first user interface for setting, in the first image, an area associated with a function that influences encoding processing, and a second user interface for setting, in the second image, an area associated with the function that influences encoding processing;

encoding the first image based on the area set using the first user interface, and encoding the second image based on the area set using the second user interface; and switching from the first user interface to the second user interface in response to a user operation to an operation button for completing the setting in the first user interface, or switching from the second user interface to the first user interface in response to a user operation to an operation button for completing the setting in the second user interface.

* * * * *